(12) United States Patent
Poncin et al.

(10) Patent No.: US 8,254,681 B1
(45) Date of Patent: Aug. 28, 2012

(54) DISPLAY OF DOCUMENT IMAGE OPTIMIZED FOR READING

(75) Inventors: Guillaume Poncin, San Francisco, CA (US); Viresh Ratnakar, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 689 days.

(21) Appl. No.: 12/491,152

(22) Filed: Jun. 24, 2009

Related U.S. Application Data

(60) Provisional application No. 61/150,293, filed on Feb. 5, 2009.

(51) Int. Cl.
*G06K 9/34* (2006.01)
*G06K 9/18* (2006.01)

(52) U.S. Cl. ......... 382/180; 382/173; 382/182; 382/229

(58) Field of Classification Search ............... 382/173, 382/180, 181, 182, 229
See application file for complete search history.

(56) References Cited

U.S. PATENT DOCUMENTS

| | | | | |
|---|---|---|---|---|
| 5,325,297 | A * | 6/1994 | Bird et al. | 715/201 |
| 5,889,897 | A * | 3/1999 | Medina | 382/310 |
| 2009/0144605 | A1 * | 6/2009 | Radakovic et al. | 715/200 |
| 2010/0198827 | A1 * | 8/2010 | Yacoub et al. | 707/739 |

* cited by examiner

*Primary Examiner* — John Strege
(74) *Attorney, Agent, or Firm* — Fenwick & West LLP

(57) ABSTRACT

Semantically meaningful segments of an image of a document, such as tables of contents, page numbers, footnotes, and the like, are identified. These segments form a model of the document image, which may then be rendered differently for different client devices. The rendering may be based on a display parameter provided by a client device, such as a display resolution of the client device, or a requested display format.

22 Claims, 5 Drawing Sheets

DISPLAY OF DOCUMENT IMAGE OPTIMIZED FOR READING

CROSS REFERENCE TO RELATED APPLICATIONS

The application claims the benefit of Provisional Application No. 61/150,293, filed on Feb. 5, 2009, which is hereby incorporated herein by reference.

BACKGROUND

1. Field of Disclosure

The disclosure generally relates to displaying digital documents, and in particular to processing digital images of printed documents and reformatting them for display on client devices.

2. Description of the Related Art

As more and more printed documents, such as books, magazines, newsletters, and the like have been scanned as digital "images" and converted to editable text using Optical Character Recognition (OCR) technology, people have increasingly come to read such documents using computers. For display of a document on a computer screen, textual versions of a document, such as the text produced via OCR, are often preferable to the image version. Compared to the document image, text is small in size and thus can be transmitted over a computer network more efficiently, leading to quicker transmission times and hence less delay before a document is displayed. Text is also editable (e.g., supports copy and paste) and searchable. Further, text can be reformatted to be displayed clearly (e.g., using a locally available font) and flexibly (e.g., using a layout adjusted to the computer screen), thereby providing a better reading experience. The above advantages are especially beneficial to those users who prefer to read documents on their mobile devices such as mobile phones and music players, which tend to have lower network transfer speeds, less memory, and smaller screens than a typical desktop or laptop computer system, and which would therefore only with difficulty be able to display a digital image of a publication.

However, text alone, if created naively, such as via conventional OCR techniques, likewise fails to provide optimal viewability. Conventional OCR techniques attempt to produce output that precisely replicates the appearance of the original document, which in many cases does not result in maximum readability of the essential content of the document. Further, aspects of the document, such as tables of contents, page numbers, headers, and the like may not be converted accurately, and even if converted accurately, may detract from the readability of the document as a whole. This is particularly so for certain types of documents, such as old public-domain books or magazines that may be discolored by age or spotted by mold, water, etc., and may contain fonts or layouts that are not well supported by current OCR techniques. As a consequence, such old documents cannot be converted by OCR as accurately as can a new document that is in pristine condition and has expected fonts/layouts. Manual techniques for addressing the problem of accurately converting these documents, such as human hand-creation of the main text and stripping of inessential features, are cumbersome and time-consuming, and do not allow display of the document to be customized for different devices.

SUMMARY

The difficulties described above are addressed by a method, computer, and computer program product that process an image of a document and identify semantically meaningful segments of the image, such as tables of contents, page numbers, footnotes, and the like. These segments form a model of the document image, which may then be rendered differently for different client devices. The rendering may be based on a display parameter provided by a client device, such as a display resolution of the client device, or a requested display format.

In one embodiment, a computer-implemented method applies an optical character recognition algorithm to an image of a document to obtain a plurality of document segments, each document segment corresponding to a region of the image of the document and having associated recognized text. The method further comprises identifying a semantic component of the document comprised of one or more of the segments, and creating a document representation comprising the document segments and identified semantic components. The method further comprises storing the document segments in association with an identifier of the image of the document.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

The computing environment described herein creates, from a printed document, a digital representation of the document that captures document semantics. It further provides to different client devices, based on the digital representation, a formatted version of the document that is suitable for display on those devices.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers are used in the figures to indicate similar or like functionality.

System Environment

Figure 1:
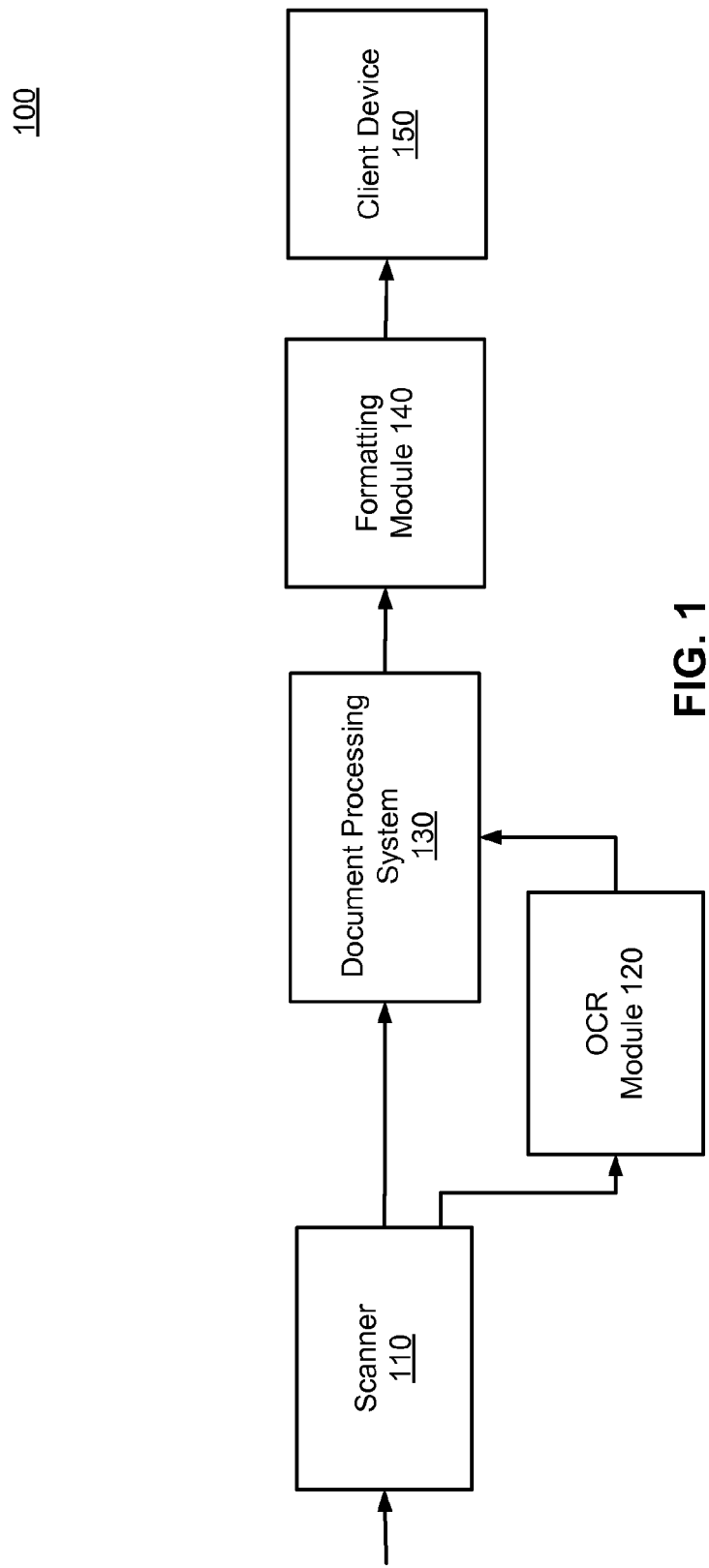
FIG. 1 is a high-level block diagram of a computing environment according to one embodiment.

FIG. 1 is a high-level block diagram that illustrates a computing environment 100 for converting printed documents into OCR'ed text and processing the text for enhanced readability on a variety of client devices, according to one embodiment. As shown, the computing environment 100 includes a scanner 110, an OCR module 120, a document processing system 130, a formatting module 140, and a client device 150. Only one of each entity is illustrated in order to simplify and clarify the present description. There can be other entities in the computing environment 100 as well.

The scanner 110 is a hardware device configured to optically scan printed documents (e.g., books, magazines, newspapers, journals, catalogues, newsletters, etc.) and convert the printed documents to digital source document images. The source document images output by the scanner 110 are provided as input to the OCR module 120 and to the document processing system 130.

The OCR module 120 converts source document images—e.g. those produced by the scanner 110—into corresponding textual representations (hereinafter called OCR'ed text), which are then provided as input to the document processing system 130. The textual representations can be embodied in various data structures in different embodiments, such as flat text, or as a tree of document elements such as pages and paragraphs.

In addition, in one embodiment the OCR module 120 generates and outputs positional information describing the location of the OCR'ed text in the source document images. For example, for each segment of text (e.g., paragraph, column, title), the OCR module 120 provides a set of numbers describing a bounding box that uniquely specifies a segment of the source document image containing the text segment. The numbers describing the bounding box include two-dimensional coordinates of the upper-left corner of a rectangle on an x-axis and a y-axis, and a width and a height of the rectangle. Therefore, the bounding box uniquely identifies a region of the source document image in the original document for the corresponding text segment. In other embodiments the bounding box can specify image segments with non-rectangular shapes.

The OCR module 120 may also generate confidence levels that measure quality of the OCR'ed text. In addition, the OCR module 120 may generate other information such as format information (e.g., font, font size, style). The OCR module 120 can be implemented by using software such as ABBYY FineReader OCR, ADOBE Acrobat Capture, and MICROSOFT Office Document Imaging. In one embodiment, the OCR module 120 converts a source document image to text before modules of the document processing system 130 process the document image. In other embodiments the actions of the OCR module 120 and the modules of the document processing system 130 can overlap in time, performed either interleaved or in parallel. For example, for a given document the document processing system 130 can perform some operations, such as initial distinguishing of text and picture data, before the OCR module 120 operates on the identified textual data portions of the document, and then the document processing system 130 can perform the remainder of its operations that rely on the presence of the OCR'ed text.

The document processing system 130 is a computer system configured to create a digital document representation that captures the document semantics not described by the raw source document images. To create the document representations, the document processing system 130 performs image and text analysis operations on the source document images to identify semantically relevant portions of the document. In one embodiment, such operations include distinguishing image and textual portions, segmenting the text into units, identifying semantically meaningful portions of a page and of the document as a whole, and determining which portions of the document have inaccurate OCR text data. The document processing system 130 produces a document representation as output. An example structure and operation of the document processing system 130 is described in further detail below in relation to FIGS. 3 and 4.

The formatting module 140 provides a version of the document to a client device 150, appropriately formatted based at least in part on display characteristics of the client device. In one embodiment, providing formatted versions of the document comprises traversing a data structure describing the document representation, determining which portions to display as text and which as image data, determining whether to display the document in scrolling or paginated form, supplementing the document data with additional information, such as internal links, and describing the document in a format useful for the requesting client, such as HTML, ePub, XML, or PDF, and the like.

The client device 150 is a computer system configured to display the formatted document for viewing by a user. The client device 150 can be, for example, a desktop or laptop personal computer, a personal digital assistant (PDA), a mobile phone, a digital television system, and the like. Different client devices 150 can have different display characteristics, such as different screen resolutions and varying abilities to display formatted text and images. The client device 150 includes an application for reading digital documents, such as a web browser (e.g., Microsoft Internet Explorer™, Mozilla Firefox™, Google Chrome™, or Apple Safari™). A user can interact with the client device 150 to retrieve a formatted document from the formatting module 140 and display it for reading.

The scanner 110 is communicatively connected with the OCR module 120 and the document processing system 130; the document processing system 130 is communicatively connected with the formatting module 140; and the formatting module 140 is in turn communicatively connected with the client device 150. The connections may be through a wired or wireless network, or they may represent interprocess communications within a single computing device. Examples of the network include the Internet, an intranet, a WiFi network, a WiMAX network, a mobile telephone network, or a combination thereof.

Computer Architecture

Figure 2:
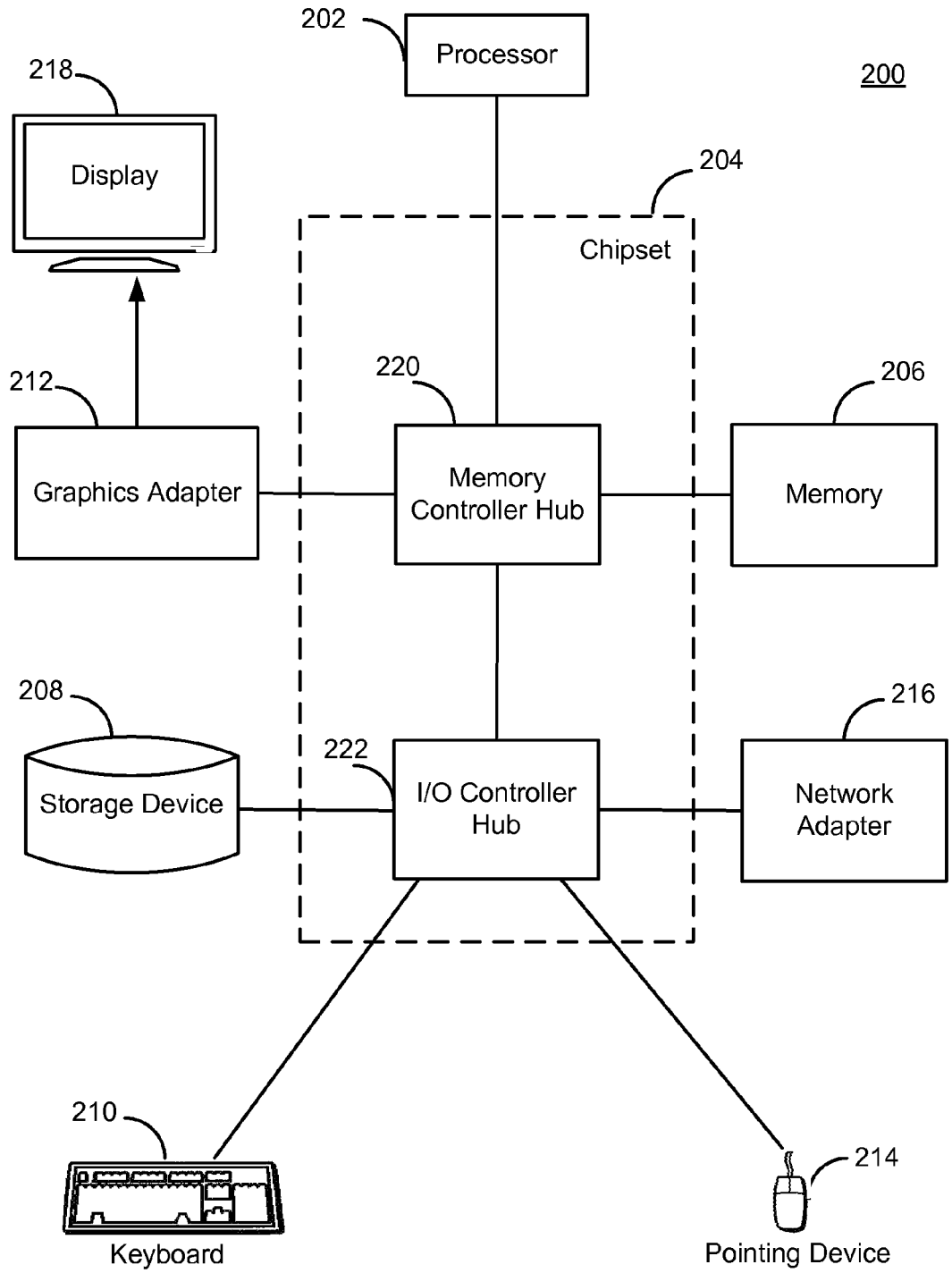
FIG. 2 is a high-level block diagram illustrating an example of a computer for use in the computing environment shown in FIG. 1 according to one embodiment

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the document processing system 130 might comprise multiple blade servers working together to provide the functionality described herein. As another example, the client device 150 might comprise a mobile telephone with limited processing power. The computers 200 can lack some of the components described above, such as keyboards 210, graphics adapters 212, and displays 218.

Example Architectural Overview of the Document Processing System

Figure 3:
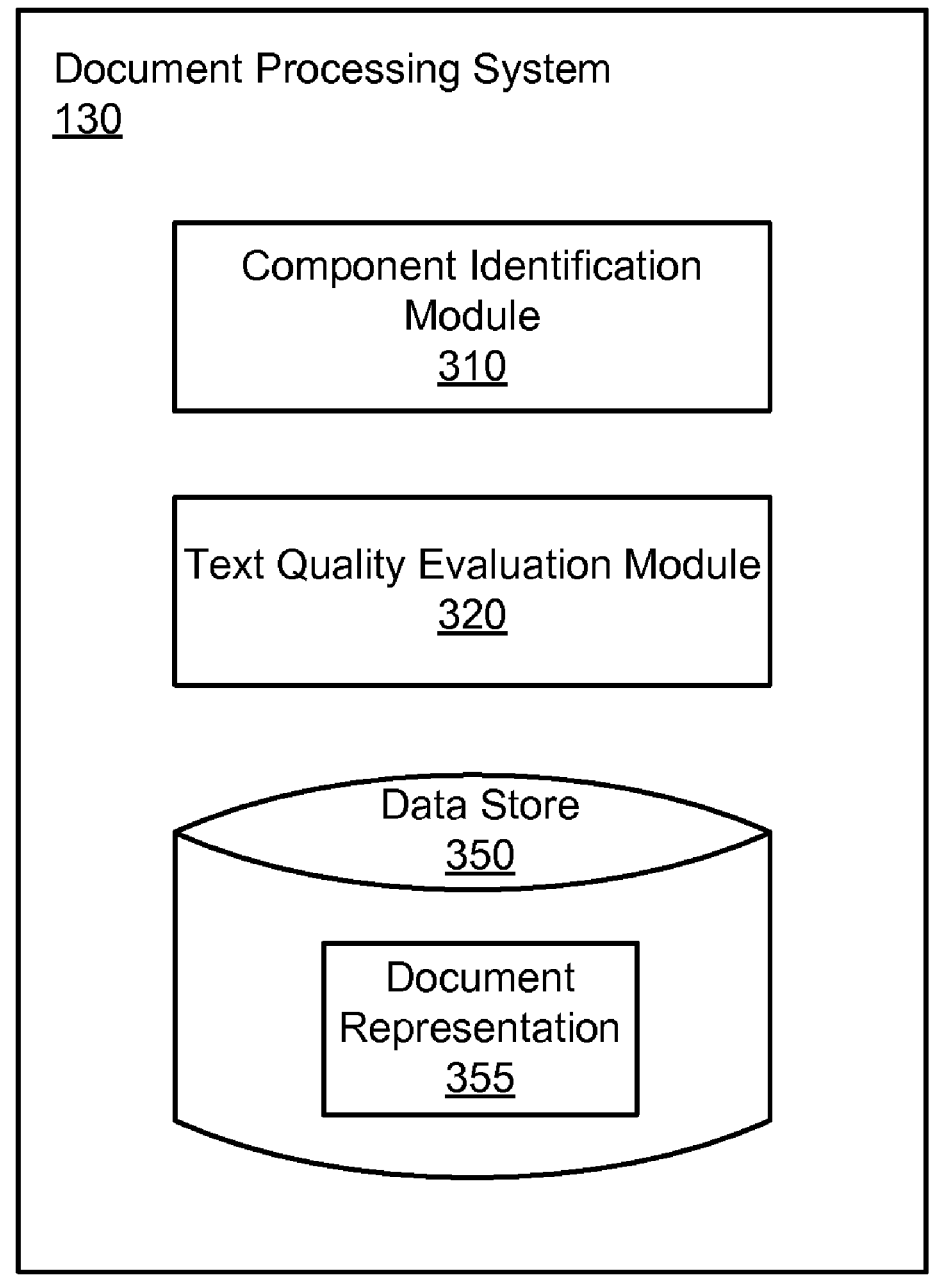
FIG. 3 is a high-level block diagram illustrating modules within a document processing system according to one embodiment.

FIG. 3 is a high-level block diagram illustrating a detailed view of modules within the document processing system 130 according to one embodiment. Some embodiments of the document processing system 130 have different and/or other modules than the ones described herein. Similarly, the functionality can be distributed among the modules in accordance with other embodiments in a different manner than is described here. As illustrated, the document processing system 130 includes a component identification module 310, a text quality evaluation module 320, and a data store 350.

The data store 350 stores data used by the document processing system 130 to provide a customized formatted version of a document for viewing on a client device 150. Examples of such data include the OCR'ed text and associated information (e.g., text quality scores, bounding boxes, source document images output by the scanner 110, and formats), data relating to the semantic document components identified by the component identification module 310, and the like. The data store 350 may be a relational database or any other type of database that stores the data, such as a flat file.

In one embodiment, the data store 350 stores a document representation 355 using a data structure such as a tree, in which semantic units of the document are represented in a hierarchical fashion: e.g., pages contain blocks (sets of related paragraphs, such as in a table), which in turn contain paragraphs, which in turn contain words, which in turn contain characters, and the like. Such a tree may be generated entirely by the document processing system 130, or an initial tree produced by the OCR module 120 may be supplemented with additional information derived by the document processing system.

The component identification module 310 performs a number of operations to identify and isolate various semantically meaningful components of the document, such as page numbers, tables of contents, headers, footnotes, and the like. In one embodiment, the operations include distinguishing image and text portions of the document, segmenting the text into meaningful units such as paragraphs, words, and the like, and identifying components of the document as a whole, such as tables of contents and indexes, and identifying components of individual pages, such as page numbers, footnotes, headers, and the like. These operations are described below in more detail with respect to FIG. 4.

The text quality evaluation module 320 generates text quality scores for text segments of the OCR'ed text based on information provided by the OCR module 120. The text quality score is a numeric value that measures an overall quality (accuracy) of the OCR'ed text segment. In one embodiment, the text quality score ranges between 0 and 100, with 0 indicating low text quality and 100 indicating high text quality.

In one embodiment, the text quality evaluation module 320 generates a set of language-conditional character probabilities for each character in the text segment. The text quality evaluation module 320 either generates, or has access to, a language model for the language of the document for which the text quality scores are being generated. For example, the language model can specify probabilities that particular characters (or, in some embodiments, words) will appear in sequence in the given language, based on statistical analysis of a large number (e.g., tens of thousands, or millions) of documents in that language. Each language-conditional character probability thus indicates how well the character and a set of characters that precede the character in the text segment match a language model for the language of the document. In one embodiment, the set of characters that precede the character is typically limited to a small number (e.g. 4-8 characters) such that characters in compound words and other joint words are given strong probability values based on the model. The language-conditional character probabilities may be combined with other indicators of text quality (e.g., the confidence levels provided by the OCR module 120) to generate a text quality score for each character in the text segment. The calculation of such a value allows for the location-specific analysis of text quality.

The text quality evaluation module 320 combines the set of text quality scores associated with the characters in a text segment (e.g., a paragraph) of the OCR'ed text to generate a text quality score that characterizes the quality of the text segment. The text quality evaluation module 320 may average the text quality scores associated with the characters in the text segment to generate the text quality score. The text quality score for a given text segment can be one factor in determining whether to display the text segment as text, or as a corresponding portion of the source document image.

Overview of Methodology for the Document Processing System

Figure 4:
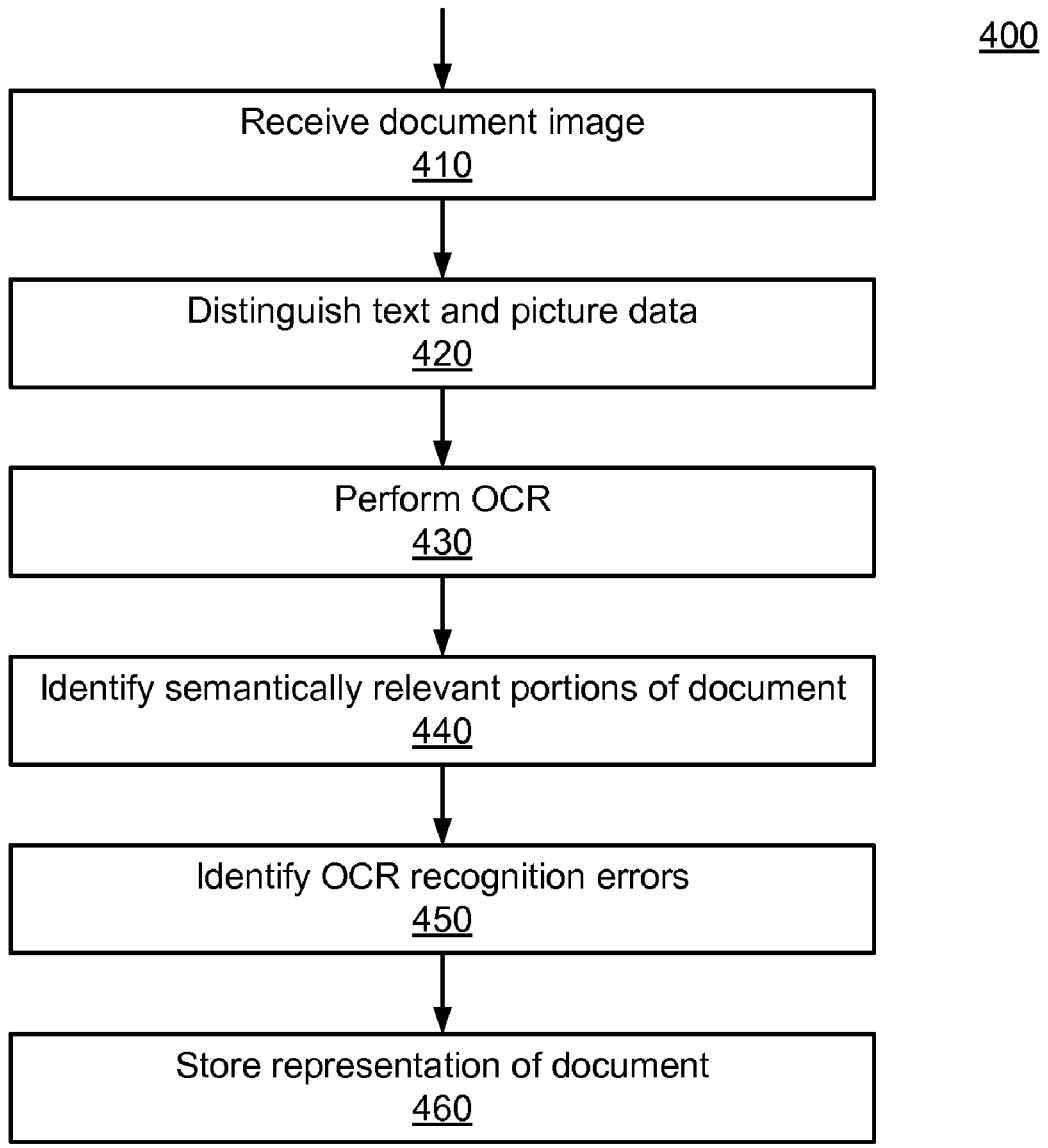
FIG. 4 is a flow diagram that illustrates the creation of a document representation according to one embodiment.

FIG. 4 is a flowchart illustrating a method 400 for the document processing system 130 to create a representation of a printed document from which formatted representations suitable for viewing on a variety of client devices can be further created, according to one embodiment. It is appreciated that other embodiments can perform the steps of the method 400 in a different order. Moreover, other embodiments can include different and/or additional steps than the ones described herein. The document processing system 130 can perform multiple instances of the steps of the method 400 in parallel.

In the embodiment of FIG. 4, the document processing system 130 receives 410 the source document image from the scanner 110. In some embodiments, the document processing system 130 also receives the OCR'ed text and its associated information—such as for each unit of the text, the coordinates of its bounding box, the confidence level of recognition, and format information such as font, style, etc.—from the OCR module 120. It then proceeds to perform a number of operations to identify and isolate various semantically meaningful components of the document, as now described in more detail.

One operation is to distinguish 420 picture and text portions of the source document image. In one embodiment, the portions are distinguished based on image morphology and color values. For example, text tends to be monochromatic (e.g., all black text), and in a Western language tends to be arranged in horizontal rows, with blank regions between the rows. Thus, for such languages a projection profile can be used to examine the frequency of image data of the source document image at various values along a vertical axis; if the image data tend to be clustered at regular vertical intervals, with gaps in between, and if the image data tends to be monochromatic, then it can be estimated with high confidence that the portion represents text. Conversely, to determine if a portion of the document represents some form of picture, such as line art or a photo, the colors and shape of the image data can be examined, with a large number of distinct colors indicating a photo, and image data with irregular shapes not clustered into text-like regular intervals indicating line art. Each of these identified portions is then marked as representing its particular type (text or picture) and associated with its location in the document, e.g. as represented by a bounding box with coordinates indicating a page-independent distance from the top of the document.

Another operation is to perform 430 OCR, e.g. via the OCR module 120 of FIG. 1. If this operation takes place after the text and picture regions are distinguished 420, then the OCR module 120 may be configured to analyze only the portions of the document that represent text, thus reducing OCR processing time. In one embodiment, preprocessing operations such as color remapping are performed prior to performing the OCR itself, and are tailored based on whether the region was found to represent text or picture data. For example, if the region was found to represent text, then the background is re-colored to a uniform shade (e.g., white), thus minimizing marks of age such as page discoloration, and the text is sharpened to make OCR more effective. If the region was found to represent picture data, then the colors are remapped to respect the content of the picture while removing the effect of aging on the printed document, for example.

The OCR module 120 then converts the document image (either as a whole, or only the regions found to represent text) to text data, representing the OCR'ed text with a data structure made available to the document processing system 130. The OCR engine additionally structures the text into units and sub-units, such as pages, paragraphs, words, and characters, which can be represented hierarchically, e.g. with a tree data structure. The data structure can additionally track data associated with the various units of the text, such as the text size or style of a particular word or paragraph.

Given the document image and/or the data structure representing the OCR'ed text, the document processing system 130 identifies 440 semantically relevant portions or features of the document, referred to as semantic components, comprised of one or more of the segments. Such semantic components may occur only once for a given document, such as the title page or table of contents, or may occur multiple times on different pages, such as page numbers and page headers. Various techniques employed by the component identification module 310 of the document processing system 130 for identifying such semantic components are now discussed.

One type of operation performed for the document as a whole is page type detection, in which a page identification submodule of the component identification module 310 identifies the type of a page as a whole, such as a copyright page, table of contents, or index. Page type detection is accomplished by applying a set of pre-constructed classifiers to a page and determining levels of correspondence between the classifiers and the page, with each classifier producing a binary "yes/no" result for each type of page (e.g., representing whether a given page is a title page or not). The document processing system 130 can initially construct the classifiers by using massively parallel logistic regression algorithms to perform machine learning, training each classifier on an input set of documents (for example, 100,000 books) for which the corresponding page or pages have been identified; for example, a classifier for recognizing title pages is trained using documents for which the title page is known. With a classifier constructed, the page identification submodule evaluates a page of interest, such as a page near the beginning or the end of the document not expected to represent a typical text page, according to the classifier to determine a probability that the page is of the classifier's type, e.g. a title page. If none of the defined classifiers matches a given page with sufficient probability, then the page identification submodule can queue the page for classification by a human reviewer, for example.

The component identification module 310 additionally comprises a table of contents identification submodule, which determines whether a given page is a table of contents page. A table of contents page includes a set of entries referred to as "line strings" having labels, section numbers, and page numbers, each being a substring of the line string. For example, for the line string "IV. Caring for South African Penguins . . . 24", "Caring for South African Penguins" is the label, "IV" is the section number, and "24" is the page number. If the labels of the various line strings in a page appear as titles in the main portion of the document text, then the page is considered to represent a table of contents page. More specifically, the table of contents identification submodule extracts a label from each line string on the page and searches for the extracted label within the main textual pages of the document, with each "hit page" (i.e., page where the label occurs) being assigned a score representing the likelihood of the hit page being the "linked title page" (i.e., the target page to which the label points). The table of contents identification submodule bases the score on various factors such as text font sizes, page number matching, term frequencies, the characteristics of the hit pages, and the like. After all hit pages of all entries of a given page have been identified and scored, the best hit page is chosen as the linked title page, the "best" page considered to be the hit page that maximizes the score while satisfying the constraint that the page numbers of the linked title pages of all the entries on the page should be in ascending order of target page number. The table of contents identification submodule selects the best page using, for example, a generalized dynamic programming algorithm. To determine whether the page is actually a table of contents page, the scores of all the linked title pages of the page are averaged, and the average compared to some threshold score; if the score is above the threshold, then the page is considered to be a table of contents page. In one embodiment, to improve the efficiency of this technique, the table of contents identification submodule indexes each line of the textual pages of the document prior to performing the technique in order to increase lookup speeds.

The component identification module 310 further comprises a section identification submodule, which identifies the beginnings of sections, such as chapters of a book, involves use of data from an identified table of contents page. More specifically, the section identification submodule considers the linked title page for each line string to represent the section beginning for that line string. When a section beginning is located in the text, additional operations may be performed, such as inserting an intra-document link in the table of contents that points to the located label.

The component identification module 310 further comprises a cover identification submodule, which identifies the front or back cover of the document. The document processing system 130 makes the initial assumption—for documents written in left-to-right Western languages, for example—that the first page represents the front cover, and the last page the back cover. This assumption can be verified by performing image processing to look for confirmatory signs, such as the presence of images and multiple colors, and the absence of large amounts of text.

The component identification module 310 further comprises a first reading page submodule, which identifies a first page to display when presenting the formatted document for reading by a user. This page represents the first main page of text in which a user would likely be interested, such as the first page after the table of contents page(s) and having at least some threshold amount of text.

The component identification module 310 further comprises a number of submodules performing identification actions for every page of the document. One such submodule is a page number detection submodule, which identifies the region of the page containing page numbers. One algorithm used by the page number detection submodule is based on the assumption that page numbers are consistently located across the pages of a book. The algorithm begins with a prior model of the likely location of page numbers on a page. The model is represented as a 2D function defined over the unit square (x, y in [0, 1]). The function's values range from 0 to 1, where higher values indicate positions more likely to contain page numbers. The algorithm can use a different prior model for left-hand and right-hand pages. In one embodiment, the model assigns high weights along the top and bottom edges of a page—the areas where page numbers are most typically located—and moderate weights along the outer edge of each page.

The algorithm then builds a specific model for the book. The first step is to determine a transformation for each page that maps its text region into the same normalized coordinate system used by the spatial model. This is done by first computing the median text bounding rectangle across all pages. This rectangle represents the bounds of a full page of text with high accuracy. Each page's text region is then mapped onto this median rectangle. A full (or essentially full) page of text is translated and scaled to fill the median bounds. Partial pages (such as a few lines at the top of the last page of a chapter, or a half-page of text at the bottom of the first page of a chapter) are detected and handled differently: they are not vertically scaled, but are instead translated to align with the top or bottom of the bounding rectangle, as appropriate.

Once each page has been mapped to the unit square, the algorithm looks at the OCR words for each page. If a word parses as a valid page number (i.e., representing a typical page number value, such as an integer, a roman numeral, and the like), the center of its bounding box (in normalized coordinates) is used to sample a value from the prior model. This value is then added to the corresponding location in a document-specific model. Once all pages have been processed, the new model is scaled to have a maximum value of 1.

Given a spatial model for the document, the algorithm now makes a second pass through the OCR data. It looks for substrings of the page text that both parse as page numbers and are spatially likely to be page numbers. During this pass, the algorithm performs transformations on the raw OCR text to compensate for typical OCR errors. For example, it can consider removing whitespace, stripping prefix and suffix characters from each word, and performing various likely character substitutions (such as 'l' to '1', etc.). The base confidence in a candidate is based on the value of the spatial model, but each transformation has an associated cost factor that reduces the confidence. The result is a list of page number candidates and accompanying confidence values for each page. In one embodiment, the highest-scoring candidate is chosen as representing the page number, presuming that its score is above some minimum threshold. In one embodiment, alleged page numbers are tested by determining whether they are in a numerical sequence with the page numbers of the surrounding pages.

The component identification module 310 further comprises a submodule which detects headers, footers, and footnotes. One geometry-based algorithm used by the submodule for detecting page headers initially normalizes the page locations in a document, so that the pages have the same margins, for example, and thus the data are located consistently across pages. The algorithm begins with known possible configurations for the headers, such as paragraphs at locations near the top of the page, containing 1, 2, or 3 parts, with perhaps one or two lines of text. Then, by examining the pages of the document, the algorithm tracks how many times the various possible configurations are matched, and identifies the configuration that most frequently is matched. Each possible header in the document is then compared to the most frequently matched configuration, with those that are sufficiently close being considered to constitute actual headers.

In one embodiment, footers are handled by the same algorithm, with the known possible configurations differing to reflect the different placement of footers compared to headers.

In one embodiment, detection of footnotes incorporates a similar approach. However, since it is more difficult to detect a footnote region using geometry/location information alone, detection of footnotes additionally examines the font size (a small font being expected) and presence of digits at the beginning of a line to verify that a given candidate region is in fact a footnote, as compared to, e.g., a generic footer.

The component identification module 310 further comprises a submodule that identifies passages of poetry using geometric techniques. More specifically, a series of sequential lines, all aligned vertically, and having a substantial amount of indentation at the beginning of each line, is considered to indicate a poetic passage.

The component identification module 310 further comprises a submodule that detects a table where there is a group of small paragraphs of words that can be grouped into columns and lines using recursive subdivisions of the horizontal and vertical projection profile.

The component identification module 310 further comprises a submodule that determines whether to merge a paragraph located at the end of one page with another paragraph located at the beginning of the next page, as representing a single paragraph broken across pages. The algorithm for doing so is geometry-based, examining the indent and punctuation characteristics of the beginning of the second paragraph. For example, if the second paragraph lacks indentation and does not begin with a capital letter, then it is not considered to represent its own paragraph, but rather to be a continuation of the prior paragraph. Thus, the two paragraphs are merged into one within the document representation data structure of the data store 350.

In addition to identifying various types of semantic components, the document processing system 130 can also identify 450 OCR recognition errors for the textual portions. The document processing system 130 calculates a text quality score for each OCR'ed text segment (e.g., through use of the text quality evaluation module 320 as noted above). These scores may later be used to determine whether to include within the formatted document the OCR text, or a corresponding portion of the document image.

The document processing system 130 then stores 460 a representation 355 of the document in association with an identifier of the image of the document (e.g., a unique file name of the image). As noted above, in one embodiment the representation 355 is based on a tree data structure initially produced by the OCR engine 315 as part of the OCR process. However, in such an embodiment the data structure stored in the data store 350 is altered from that initially produced by the OCR engine 315 due to changes by the various operations of FIG. 4. For example, paragraph continuation determination operations may cause originally distinct paragraphs to be joined into a single paragraph within the data structure. The information stored for the various text components of the document may also be supplemented with additional information derived by the document processing system 130, either as part of the process of identifying semantically meaningful components of the document, or as part of the later process of providing a version of the document formatted for a given client device 150. For example, as a result of semantic component identification a unit for a page within the tree can be marked as being a table of contents page, or a paragraph can be marked as representing a footnote region.

Creation of Formatted Representation

Figure 5:
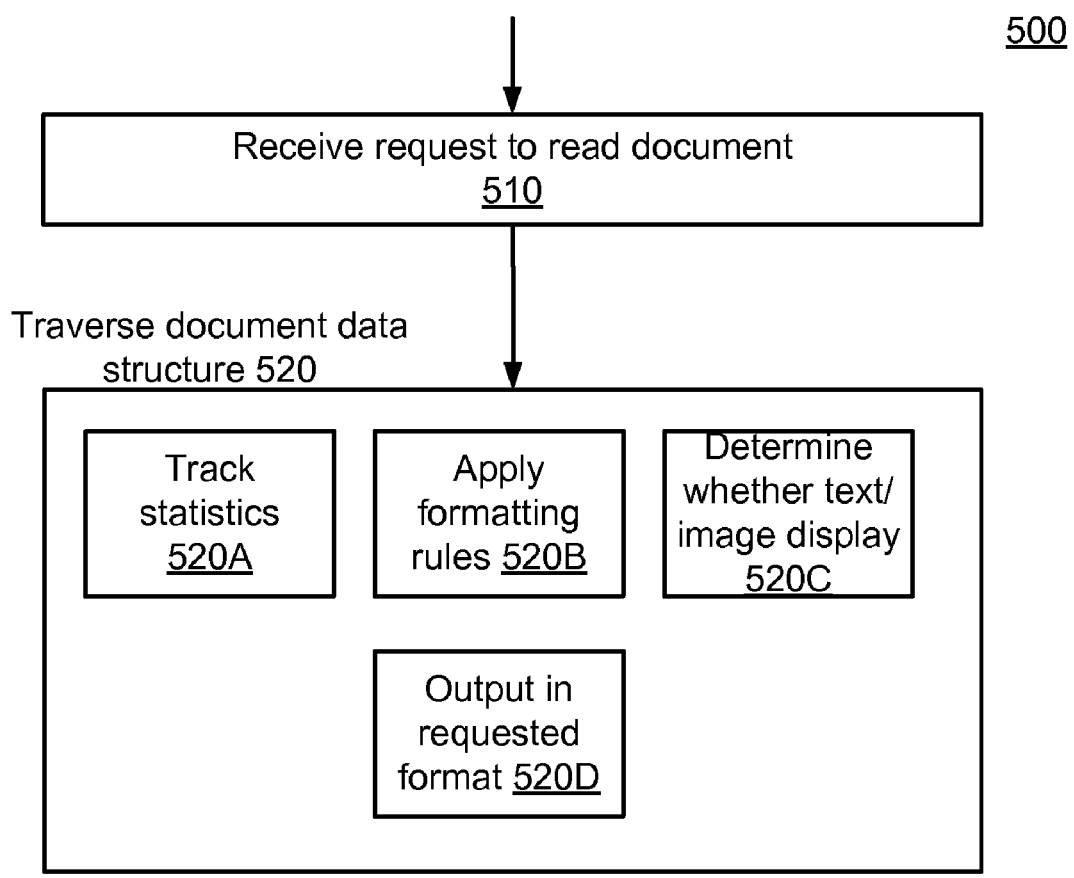
FIG. 5 is a flow diagram that illustrates providing a client with a formatted representation of a document.

With the document representation 355 created, the formatting module 140 can then use the document representation to provide a client device 150 with a particular formatted representation suited to the device, as depicted in FIG. 5, and now described in more detail. First, a request is received 510 from the client device 150 to read a document, the request specifying various document display parameters describing how the document should look, in addition to specifying the identity of the document itself. For example, the user can request the document via a conventional web browser running on the client device 150, e.g. by clicking on a link to the document. In such a case, the identity of the document and the document display parameters can be encoded in a uniform resource locator (URL) associated with the link. One document display parameter that can be specified is the characteristics of the display of the client device 150, such as the dimensions of the screen in pixels. Another document display parameter is the desired data format of the formatted document, e.g. HTML, XML, ePub, or PDF. Another display parameter is whether the formatted document should be one single unit without page breaks, or whether it should be paginated with page sizes corresponding to the display of the client device 150.

To output the formatted document based on the document representation 355, the document representation data structure is traversed 520. In the case of a tree data structure document representation, the tree is traversed recursively, with display characteristics for the more granular elements being determined first, and then aggregated into display characteristics for higher level elements. For example, the display characteristics for the leaf nodes of the tree, such as individual characters, are determined first, and then those characteristics aggregated for the words containing the characters, and the characteristics of the words in turn being aggregated into characteristics for the paragraphs containing the words.

In one embodiment, statistics are tracked 520A while the document representation 335 is being traversed, if such statistics were not already calculated during the creation of the document representation or during a prior creation of a corresponding formatted document. Such statistics could include, for example, character counts for characters, words, paragraphs, and the like.

As each element of the data structure is traversed, the formatting module 140 applies 520B formatting rules to decide, based on rules specified for different classes of display characteristics (e.g. screen size, as specified for example in a URL, as noted above) and/or desired format types (e.g. HTML), whether and/or how to display a given text unit. For example, a rule for displaying a footnote element on a small mobile device could specify omitting the footnote entirely to aid in readability, whereas a rule for formatting a footnote on a desktop computer with a large display could specify displaying the footnote in small text, set off from the main text within a left-justified box. As another example, a rule for displaying a page number could specify omitting the page number entirely when displaying a continuous (non-paginated) view, and displaying it when paginating the document to fit the screen size of the client device.

Also while the data structure is being traversed, the document processing system 130 determines 520C whether to display a particular unit of text as text or as an image. For example, in one embodiment if the text quality score for a unit such as a paragraph equals or exceeds some threshold indicating sufficient quality, then that unit is output as the OCR'ed text. If the value falls short of the threshold, then a portion of the document image corresponding to the location of the text unit (e.g., the bounding box specified by the OCR engine 315) is displayed, instead. This approach ensures that even units of the document for which the OCR may not have produced accurate results are still displayed so as to be legible. In another embodiment, the size of the unit is taken into consideration. For example, a paragraph unit covering a very small area for which the text quality score indicates low quality can be entirely discarded, on the assumption that it represents, for example, a mere stain on the page rather than actual text. In another embodiment, the decision of whether to output a unit as text or image data depends in part on the type and/or display characteristics of the client device 150. For example, the formatting rules for a handheld device could be biased towards providing text in the interests of reducing network transfer times and memory requirements, whereas the formatting rules for a desktop computer with a broadband connection could contain no such bias. In one embodiment, both text and image versions are provided to the client 150—either together during an initial transmission, or separately, with the image version being provided only on demand—thus allowing the user to read both versions, as needed. For example, a mouse click on a text unit having a text quality score indicating low OCR quality could lead to the fetching and display of a portion of the document image associated with the text unit.

In one embodiment, each unit of the text is output 520D in the format requested by the client device 150, such as HTML, PDF, ePub, XML, and the like. For example, if the requested format is HTML, characters and words are aggregated into paragraphs and the resulting paragraphs are displayed via the <p> tag; paragraphs are aggregated into blocks and displayed using the <div> tag; tables are displayed using the <table> tag; and images are displayed using the <img> tag. Styling details are specified using cascading style sheets (CSS).

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for processing digital documents and reformatting them for display on client devices. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method for identifying semantically meaningful segments of an image of a document, the image of the document having a plurality of pages, the method comprising:
   applying an optical character recognition algorithm to the image of the document to obtain a plurality of document segments, each document segment corresponding to a region of the image of the document and having associated recognized text;
   calculating a text quality score for at least one document segment of the plurality of document segments, the text quality score characterizing a quality of optical character recognition for the document segment;
   identifying a semantic component of the document comprised of one or more of the document segments;
   creating a document representation comprising the document segments and identified semantic components;
   storing the document representation in association with an identifier of the image of the document; and
   for the document segment, determining, based at least in part on the text quality score associated with the document segment, whether to display the document segment as the associated recognized text of the document segment, or as a portion of the image of the document corresponding to the document segment.

2. The computer-implemented method of claim 1, further comprising modifying a background of a textual portion to have a uniform shade of color before applying the optical character recognition algorithm to the image of the document.

3. The computer-implemented method of claim 1, wherein identifying the semantic component comprises identifying a type of a page of the image of the document, the identifying comprising evaluating the page according to a classifier for each of a plurality of possible page types, the classifier for a possible page type being derived from performing machine learning on a set of pages of that type.

4. The computer-implemented method of claim 1, wherein identifying the semantic component comprises:
   scoring a page of the image of the document based at least in part on degrees to which portions of the page occur within other pages of the image of the document; and
   responsive to the score being above a threshold score, determining that the page represents a table of contents.

5. The computer-implemented method of claim 1, wherein the semantic component identified is a page number, the identifying comprising:
   for a location of a page containing the identified semantic component:
      determining a number of words parsing as valid page numbers and located at that location;
      determining an expected probability of the location containing page numbers; and
      identifying the location as containing a page number based at least in part on the determined number of words and the determined expected probability.

6. The computer-implemented method of claim 1, further comprising:
   merging a first and a second segment representing paragraphs, responsive at least in part to the first segment being the last paragraph on a page and the second segment being the first paragraph on a next page after the page, and responsive at least in part to indentation and punctuation characteristics of a beginning of the second segment.

7. The computer-implemented method of claim 1, further comprising providing to a client device a representation of the document, wherein a semantic component is displayed differently from its visual representation in the image of the document, responsive at least in part to one or more of a display resolution of the client device, a requested display format, and a designation of whether to paginate the document with page breaks of sizes corresponding to a size of a display of the client device.

8. The computer-implemented method of claim 1, further comprising:
   distinguishing textual and picture portions of the image of the document; and
   excluding the picture portions from processing by the optical character recognition algorithm.

9. A non-transitory computer-readable storage medium having executable computer program instructions embodied therein for identifying semantically meaningful segments of an image of a document, the image of the document having a plurality of pages, actions of the computer program instructions comprising:
   applying an optical character recognition algorithm to the image of the document to obtain a plurality of document segments, each document segment corresponding to a region of the image of the document and having associated recognized text;
   calculating a text quality score for at least one document segment of the plurality of document segments, the text quality score characterizing quality of optical character recognition for the document segment;
   identifying a semantic component of the document comprised of one or more of the document segments;
   creating a document representation comprising the document segments and identified semantic components;
   storing the document representation in association with an identifier of the image of the document; and
   for the document segment, determining, based at least in part on the text quality score associated with the document segment, whether to display the document segment as the associated recognized text of the document segment, or as a portion of the image of the document corresponding to the document segment.

10. The computer-readable storage medium of claim 9, the actions of the computer program instructions further comprising modifying a background of a textual portion to have a uniform shade of color before applying the optical character recognition algorithm to the image of the document.

11. The computer-readable storage medium of claim 9, wherein identifying the semantic component comprises identifying a type of a page of the image of the document, the identifying comprising evaluating the page according to a classifier for each of a plurality of possible page types, the classifier for a possible page type being derived from performing machine learning on a set of pages of that type.

12. The computer-readable storage medium of claim 9, wherein identifying the semantic component comprises:
   scoring a page of the image of the document based at least in part on degrees to which portions of the page occur within other pages of the image of the document; and
   responsive to the score being above a threshold score, determining that the page represents a table of contents.

13. The computer-readable storage medium of claim 9, wherein the semantic component identified is a page number, the identifying comprising:
   for a location of a page containing the identified semantic component:
      determining a number of words parsing as valid page numbers and located at that location;
      determining an expected probability of the location containing page numbers;
      identifying the location as containing a page number based at least in part on the determined number of words and the determined expected probability.

14. The computer-readable storage medium of claim 9, the actions of the computer program instructions further comprising:
   merging a first and a second segment representing paragraphs, responsive at least in part to the first segment being the last paragraph on a page and the second segment being the first paragraph on a next page after the page, and responsive at least in part to indentation and punctuation characteristics of a beginning of the second segment.

15. The computer-readable storage medium of claim 9, the actions of the computer program instructions further comprising providing to a client device a representation of the document, wherein a semantic component is displayed differently from its visual representation in the image of the document, responsive at least in part to one or more of a display resolution of the client device, a requested display format, and a designation of whether to paginate the document with page breaks of sizes corresponding to a size of a display of the client device.

16. The computer-readable storage medium of claim 9, the actions of the computer program instructions further comprising:
   distinguishing textual and picture portions of the image of the document; and
   excluding the picture portions from processing by the optical character recognition algorithm.

17. A computer system for providing a client device with a version of an image of a digital document formatted for the client device, the system comprising:
   a computer processor; and
   a computer-readable storage medium having executable computer program instructions embodied therein that when executed by the computer processor perform actions comprising:
      applying an optical character recognition algorithm to the image of the document to obtain a plurality of document segments, each document segment corresponding to a region of the image of the document and having associated recognized text;
      calculating a text quality score for at least one document segment of the plurality of document segments, the text quality score characterizing quality of optical character recognition for the document segment;
      identifying a semantic component of the document comprised of one or more of the document segments;
      creating a document representation comprising the document segments and identified semantic components;
      storing the document representation in association with an identifier of the image of the document; and
      for the document segment, determining, based at least in part on the text quality score associated with the document segment, whether to display the document segment as the associated recognized text of the document segment, or as a portion of the image of the document corresponding to the document segment.

18. The computer system of claim 17, the actions of the computer program further comprising modifying a background of a textual portion to have a uniform shade of color before applying the optical character recognition algorithm to the image of the document.

19. The computer system of claim 17, wherein identifying the semantic component comprises:
   scoring a page of the image of the document based at least in part on degrees to which portions of the page occur within other pages of the image of the document; and
   responsive to the score being above a threshold score, determining that the page represents a table of contents.

20. The computer system of claim 17, the actions of the computer program further comprising providing to a client device a representation of the document, wherein a semantic component is displayed differently from its visual representation in the image of the document, responsive at least in part to one or more of a display resolution of the client device, a requested display format, and a designation of whether to paginate the document with page breaks of sizes corresponding to a size of a display of the client device.

21. The computer-implemented method of claim 1, wherein calculating the text quality score for the document segment comprises:
   storing a language model for a language of the document, the language model specifying probabilities of different characters appearing in the language of the document;
   using the language model to determine a measure of how well text characters in the document match the language of the document; and
   calculating the text quality score using the measure.

22. The computer-implemented method of claim 4, further comprising:
   for a first portion of the table of contents page that occurs within other pages of the document, inserting a link in the document at the portion, the link linking to a second portion of the document containing text that matches text of the first portion.

* * * * *